Aug. 13, 1940.  H. W. MACKEY  2,211,665
VENTILATING WINDOW FOR VEHICLE BODIES
Filed Jan. 23, 1935   3 Sheets-Sheet 1
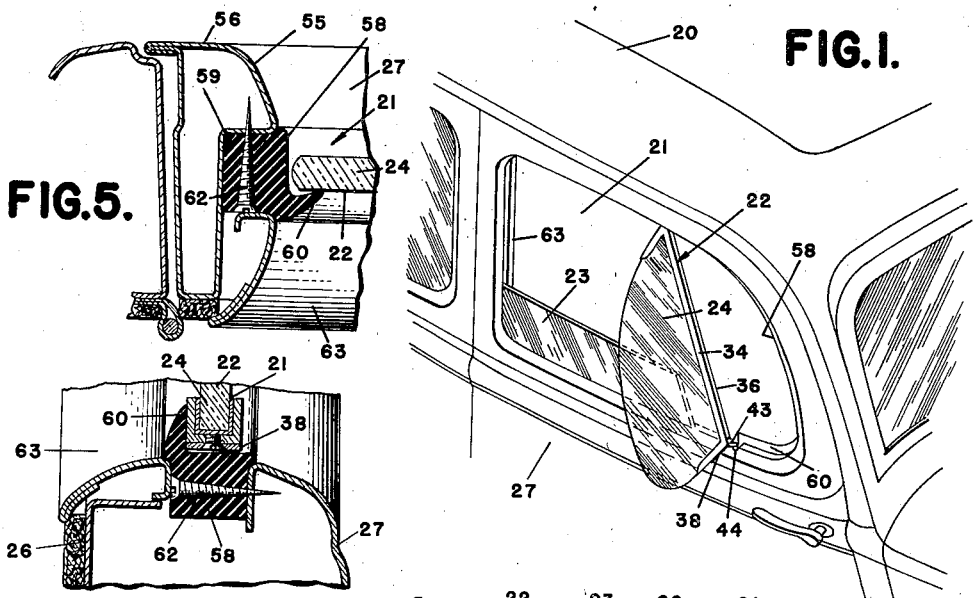
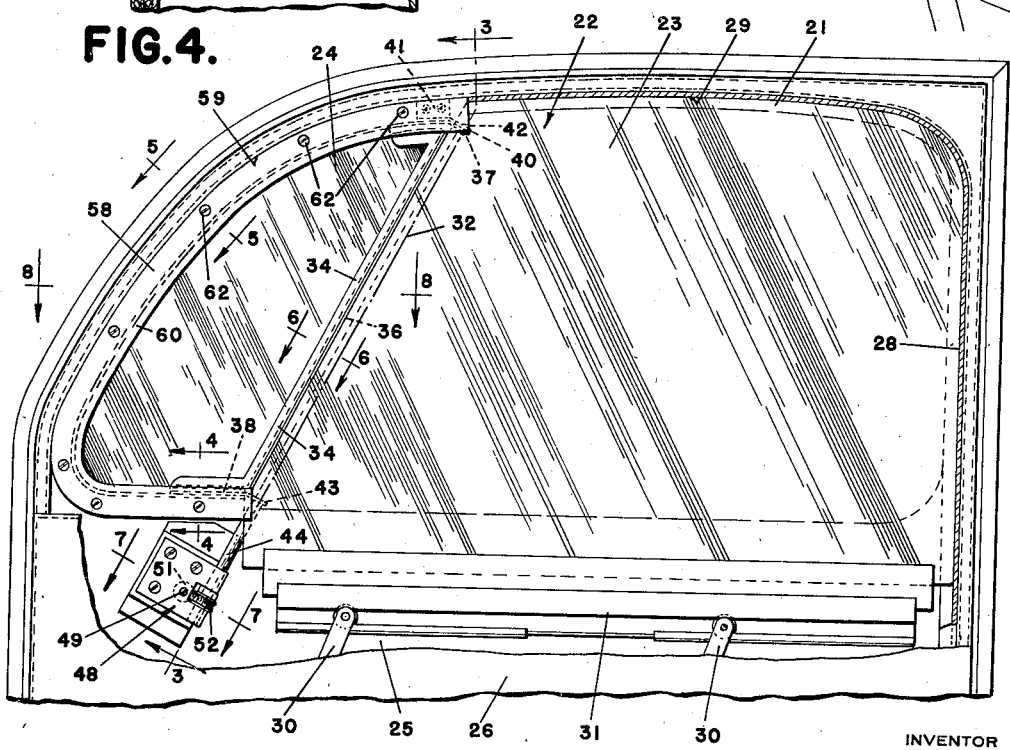
INVENTOR
HENRY W. MACKEY
BY
ATTORNEYS Aug. 13, 1940. H. W. MACKEY 2,211,665
VENTILATING WINDOW FOR VEHICLE BODIES
Filed Jan. 23, 1935 3 Sheets-Sheet 2
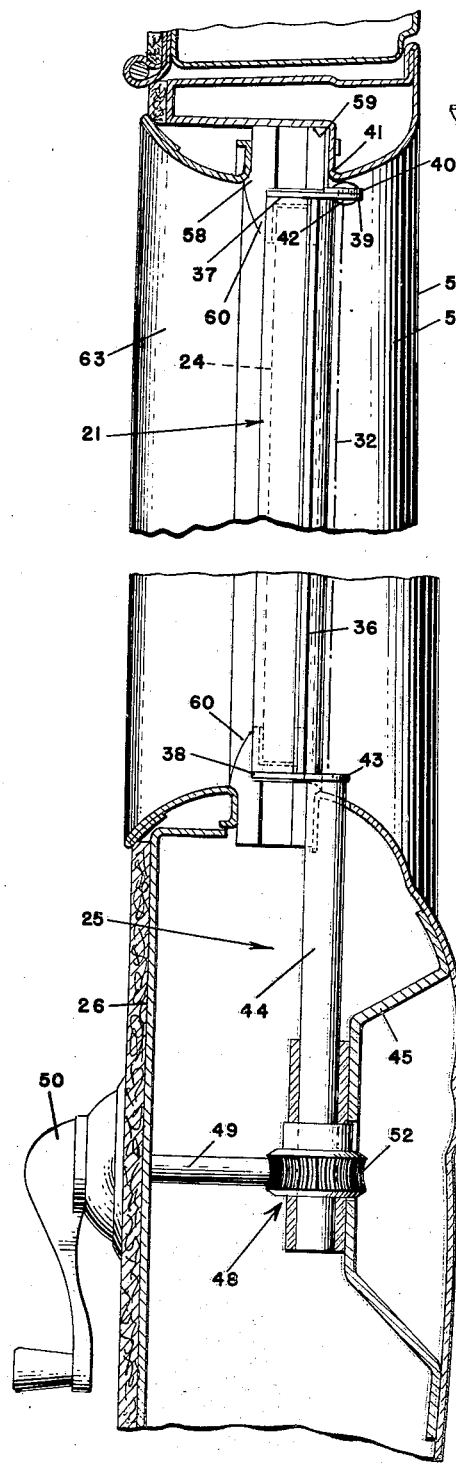
FIG. 3.
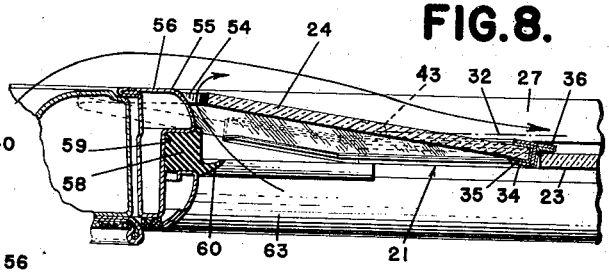
FIG. 8.
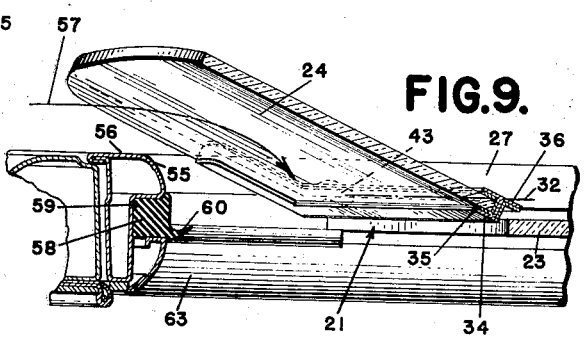
FIG. 9.
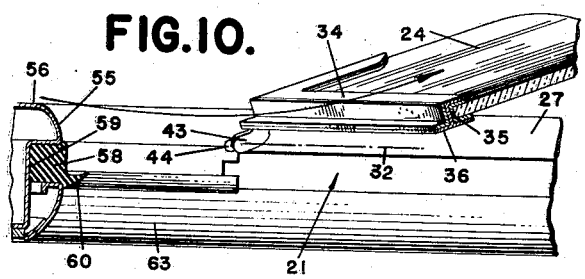
FIG. 10.
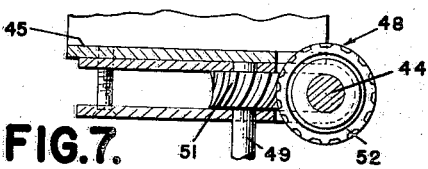
FIG. 7.
FIG. 6.
INVENTOR
HENRY W. MACKEY
BY Whittemore Hulbert
Whittemore & Belknap
ATTORNEYS

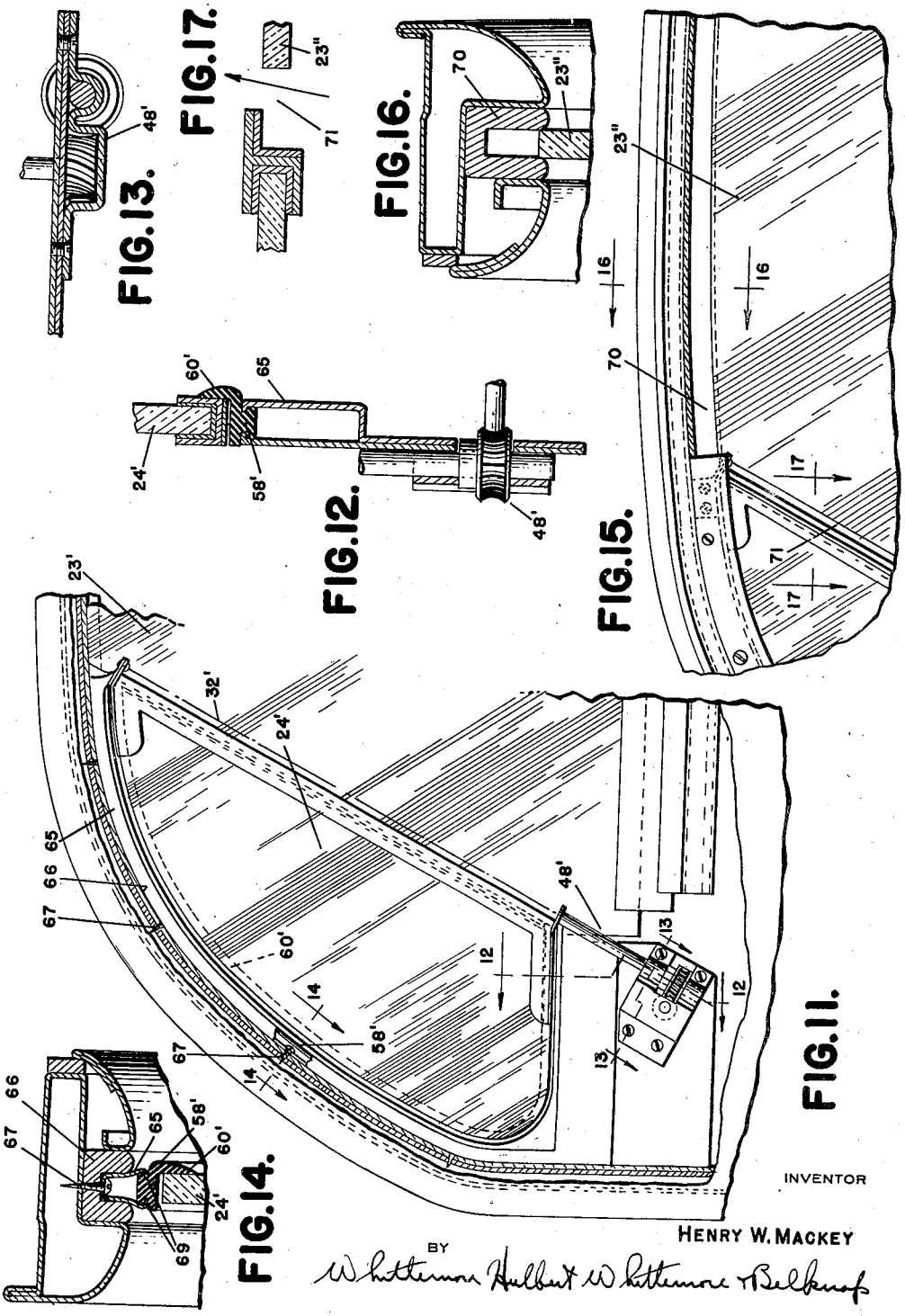

Patented Aug. 13, 1940

2,211,665

UNITED STATES PATENT OFFICE 2,211,665

VENTILATING WINDOW FOR VEHICLE BODIES

Henry W. Mackey, Detroit, Mich., assignor to Motor Products Corporation, Detroit, Mich., a corporation of New York Application January 23, 1935, Serial No. 3,100

8 Claims. (Cl. 296—44)

This invention relates generally to ventilating systems for vehicle bodies and refers more particularly to improvements in ventilating window constructions of the type having a sliding panel adapted to close the rear portion of the window opening, and having a pivoted panel in the forward portion of the opening cooperating with the sliding panel to completely close the latter opening.

One of the principal objects of this invention is to provide a ventilating window of the character set forth, wherein the pivoted panel is mounted for swinging movement about an up and down axis located adjacent the rear edge of the pivoted panel and permitting the forward edge of the latter to be swung outwardly from the plane of the window opening to various different positions with respect to this plane, so as to obtain different degrees of ventilation upon normal forward motion of the vehicle.

In accordance with this invention, air may be withdrawn from the interior of the vehicle body by swinging the pivoted panel from a position within the plane of the window opening to a position wherein the forward edge of the panel is located within the confines of the body structure surrounding the window opening substantially flush with a vertical plane, including the outer surface of this body structure. Movement of the pivoted panel to the aforesaid position thereof, not only provides a slot between the forward edge of the pivoted panel and adjacent body structure of sufficient width to permit air to be withdrawn therethrough from the interior of the body by the air flowing across the outer side of the slot, but in addition, streamlines the body structure at the forward end of the window opening, which is desirable since it materially reduces the noise created by the air stream flowing around the vehicle body. On the other hand, air may be taken into the vehicle by swinging the forward edge of the pivoted panel laterally beyond the body structure defining the front side of the opening and if desired, the pivoted panel may be further swung outwardly to assume a position adjacent the rear portion of the window opening so as to act as a shield, preventing air from flowing into the body directly against the occupants thereof.

Another advantageous feature of this invention resides in the provision of a ventilating window of the character set forth above having an angle strip fixed to the rear edge thereof and operable in the closed position of the pivoted panel to receive or form a guide for the sliding panel.

Still another feature of the present invention resides in the provision of a ventilating window of the type set forth in the preceding paragraph wherein the axis of swinging movement of the pivoted panel is substantially parallel to the forward edge of the sliding panel and is located in a plane offset outwardly with respect to the plane of the sliding panel so as to permit angularly adjusting the pivoted panel to the foregoing positions thereof when the sliding panel is in its closed position without interference by the angle strip at the rear edge of the pivoted panel.

A further object of this invention resides in the provision of a ventilating window of the general type previously described having provision for withdrawing air from the interior of the vehicle body without moving the pivoted panel from its closed position within the plane of the window opening. In accordance with this invention, the slot in the window required to secure the above result is formed between the rear edge of the pivoted panel and the forward edge of the sliding panel upon initial movement of the latter downwardly from its closed position, and the construction is such that this slot is effected before the upper edge of the sliding panel leaves the channel usually associated with the top header of the window opening.

In addition to the foregoing, the present invention contemplates an improved ventilating window construction capable of being inexpensively manufactured, assembled and installed. The particular construction of the several embodiments of this invention selected for the purpose of illustration will be made more apparent as this description proceeds, especially when considered in connection with the accompanying drawings, wherein:

Figure 1 is a fragmentary perspective view of a vehicle body equipped with a ventilating window constructed in accordance with this invention;

Figure 2 is an inside elevational view of a ventilating window with the finish molding removed and with certain parts broken away for the sake of clearness;

Figure 3 is a sectional view taken on the plane indicated by the line 3—3 of Figure 2;

Figures 4, 5, 6, 7, and 8 are detailed cross sectional views taken respectively on the lines 4—4, 5—5, 6—6, 7—7 and 8—8 of Figure 2;

Figures 9 and 10 are views similar to Figure 8, showing the pivoted panel of the ventilating window in different positions of adjustment;

Figure 11 is a fragmentary outside elevational view of a slightly modified form of ventilating window;

Figure 12 is a sectional view taken on the plane indicated by the line 12—12 of Figure 11;

Figure 13 is a cross sectional view taken on the plane indicated by the line 13—13 of Figure 11;

Figure 14 is a cross sectional view taken on the plane indicated by the line 14—14 of Figure 11;

Figure 15 is a fragmentary elevational view of another modified form of ventilating window; and Figures 16 and 17 are cross sectional views taken respectively on the planes indicated by the lines 16—16 and 17—17 of Figure 15.

Referring now more in detail to the drawings, it will be noted that in Figure 1 I have illustrated a portion of a vehicle body 20 having a window opening 21 in one side thereof and having a ventilating window 22 for said opening. The ventilating window 22 comprises essentially two transparent panels 23 and 24. The panel 23 is mounted in the rear portion of the window opening 21 for vertical sliding movement from a position within the latter portion of the opening to a position within the usual space 25 between the inner and outer body panels 26 and 27 respectively. In accordance with conventional practice, the panel 23 is guided throughout its movement by the usual channel-shaped runway 28 secured to the rear side of the window opening in such a manner as to receive the rear vertical edge of the panel 23 and having a portion 29 extending along the upper side of the window opening for receiving the top edge of the panel 23 when the latter is in its uppermost position. The panel 23 may be moved into and out of registration with the rear portion of the window opening 21 in the usual manner by means of the regulator arms 30 having the free ends engaging a retainer 31 secured to the lower edge of the panel 23 and having the opposite ends connected to any suitable regulator mechanism for operation thereby.

As shown in Figure 2, the forward edge of the panel 23 is inclined rearwardly from the lower side of the window opening and the portion of the latter in advance of the panel 23 is adapted to be closed by the pivoted panel 24. When the pivoted panel 24 is closed, the same assumes a position in the plane of the sliding panel 23 and the rear edge of the pivoted panel is inclined to a degree corresponding substantially to the degree of inclination of the forward edge of the panel 23 so as to permit location of both of these edges in juxtaposition to each other when the two panels are closed. In general, the rear edge of the panel 24 is pivotally supported upon an up and down axis, designated generally in the several figures by the reference character 32, for outward swinging movement relative to the plane of the window opening, and the manner in which the foregoing is accomplished without interfering with the sliding panel 23, irrespective of the position of the latter with reference to the window opening, will now be described.

In detail, the rear marginal edge of the pivoted section 24 and portions of the adjacent edges thereof engage within a channel-shaped frame section 34 having a base portion 35 adapted to assume a position between the adjacent edges of the two panels in their closed positions. In addition, the frame section 34 is provided with a flange 36 extending rearwardly from the outer longitudinal edge portion of the base 35 and adapted to overlap the outer side of the panel 23, in the manner clearly shown in Figure 6 to not only form an effective weather seal between the adjacent edges of the two panels when the latter are in their closed positions, but to also support the forward edge of the sliding panel.

In Figure 3 of the drawings, it will be noted that the frame section 34 is provided with a pair of brackets 37 and 38. The bracket 37 is permanently secured to the top of the frame section 34 and is provided with a laterally outwardly projecting extension 39 arranged in a plane perpendicular to a plane including the axis 32 of pivotal movement of the panel 24. The portion 39 of the bracket 37 is pivotally connected to a similarly disposed portion 40 of a cooperating bracket 41 by means of a pin 42 having its axis aligned with the axis 32. The bracket 41 is secured within the runway 29, or in other words, is secured to the upper header of the window opening and as a consequence serves to pivotally support the upper end of the panel 24 in the window opening. The bracket 38 is provided with a portion 43 disposed substantially parallel to the portion 39 of the bracket 37 and permanently secured to the upper end of a shaft 44 having the lower end portion journaled upon a bracket 45 in such a manner that the axis of the shaft is in alignment with the axis 32, previously referred to.

It will be apparent from the foregoing that the brackets 37 and 38, in effect, form cranks oscillatable about the axis 32 and carrying at the outer ends the panel 24 so that the latter is actually displaced outwardly with respect to the plane of the window opening when the same is swung about the axis 32. In this connection, it may be pointed out that the axis 32 is substantially parallel to the adjacent edges of the two panels and is positioned slightly rearwardly of the forward edge of the sliding panel 23 in a plane offset outwardly with respect to the plane of said panel. In other words, the location of the axis 32 is carefully predetermined so as to permit outward swinging movement of the panel 24 from its closed position in the plane of the window opening without interference by the flange 36 on the frame section 34, even though the panel 23 is in its closed or uppermost position.

For swinging the panel 24 about the axis 32 I provide suitable irreversible adjusting mechanism designated in Figures 2, 3, and 7 by the reference character 48. This mechanism comprises a drive shaft 49 having an operating handle 50 secured to the inner end thereof and having a worm 51 fixed to the outer end thereof and adapted to mesh with a worm wheel 52 secured to the shaft 44. It will be noted from Figure 2, that the mechanism 48 is located in the space 25 between the inner and outer body panels in advance of the sliding panel 23 so as not to interfere with the operation of the latter.

With the pivoted panel in its closed position it will be noted that rotation of the operating handle 50 in one direction will effect a rotation of the shaft 44 about the axis 32, and since the extension 43 of the bracket 38 is rigidly secured to this shaft, it necessarily follows that the panel 24 will be simultaneously swung and moved outwardly with respect to the plane of the window opening. The extent of swinging movement of the forward edge of the panel 24 with reference to the plane of the window opening depends, of course, on the extent of movement of the operating handle 50, and due to the irreversible drive mechanism this panel will be held in any one of its various adjusted positions. For example, when it is desired to merely withdraw air from the interior of the body, the pivoted panel 24 is adjusted to the position thereof shown in Figure 8, wherein the forward edge of this panel forms a relatively narrow slot 54 with the adjacent body structure 55 so that the air stream passing around the exterior of the vehicle, during forward motion of the latter, withdraws air from the interior of the body out of this slot. It may be pointed out in this connection, that when the foregoing results are desired, the outermost edge of the front side of the pivoted panel is located substantially flush with the outer surface 56 of the body structure 55 so that the panel 24, in effect, streamlines this portion of the body structure and thereby materially reduces the objectionable noises of the air stream passing around the forward portion of the body. On the other hand, when it is desired to direct air into the vehicle body, the pivoted panel 24 may be swung to the position thereof shown in Figure 9, wherein the forward edge of the panel is spaced laterally outwardly from the pillar 55 causing the air to take the path of travel indicated by the arrow 57. In the event it is desired to employ the pivoted panel 24 as a shield or a wing to deflect the air stream away from the window opening, the panel may be moved to the position thereof shown in both of Figures 1 and 10.

In the closed position of the pivoted panel 24, an effective weather seal is formed around the free edges of this panel by means of a rubber strip 58 having the lower edge secured to the outer body panel 27 in the manner shown in Figure 4 and having the remaining portion thereof secured in the recess 59 usually provided in the body structure for receiving the glass runways. These runways, however, are omitted in the present instance and the rubber strip is substituted therefor. It will be observed from the drawings, that the rubber strip 58 is provided with a flange 60 extending into the window opening for engagement with the inner sides of the free edges of the panel 24 when the latter is in its closed position so as to not only restrict movement of the panel, but to also provide the weather seal previously referred to. In the present instance, the rubber strip is secured in place by a plurality of screws 62 accessible from the inner side of the window opening and normally concealed by the finish molding 63.

The ventilating window disclosed in Figures 11 to 14 inclusive is the same as the one previously described insofar as the principle of operation is concerned, but differs therefrom, in that the pivoted panel 24' instead of being built into the body as in the first described form of the invention, constitutes a separate unit capable of being installed in vehicle bodies of the type now more or less commercially employed. In detail, the pivoted panel 24' is mounted within a frame 65 which in turn is secured in the usual glass runway 66 by means of screws 67. As shown in Figure 11, the panel 24' is pivotally mounted in the frame for swinging movement about the axis 32' located in the same position with respect to the sliding panel 23' as the axis 32 described in some detail in connection with the first embodiment of this invention. The operating mechanism 48' for the pivoted panel 24' may be identical to the operating mechanism 48 previously described, but in the present instance is carried by the frame 65 so as to form a unit with the pivoted panel.

As shown in Figure 14, the frame 65 is substantially channel-shaped in cross section and is secured in the runway 66 with the channel opening inwardly with respect to the window opening and having terminal flanges 69 at the free edges of the legs of the channel extending toward each other for engagement with a weather strip 58' to secure the latter in assembled relation to the frame. As in the first described form of the invention, the weather strip 58' extends around the free edges of the panel 24' and is provided with a flange 60' projecting inwardly with respect to the window opening to such an extent as to overlap the inner sides of the aforesaid free edges of the panel when the latter is in its closed position.

The ventilating window featured in Figures 15 to 17 inclusive is the same in construction as the window forming the subject matter of the first described form of this invention, with the exception that provision is made for withdrawing air from the interior of the body when the pivoted panel is in its closed position. This feature is obtained in the present illustrative embodiment of the invention without effecting a draft, by increasing the depth of the window channel 70 on the upper header of the window opening to such an extent as to permit the sliding panel 23'' to be lowered sufficiently to effect a slot 71 between the forward edge thereof and the adjacent portion of the pivoted panel before the upper edge of the sliding panel disengages from the channel 70. It will, of course, be apparent that during the normal forward motion of the vehicle, the air stream flowing by the ventilating window at the outer side thereof will withdraw air from the interior of the body out of the slot 71. It will also be observed that although this feature is shown in connection with a ventilating window identical in construction to the one featured in the first described form of this invention, nevertheless, it may also be obtained with the construction of ventilating window shown in Figures 11 to 14 inclusive by merely increasing the depth of the channel in the upper header of the window opening for receiving the upper edge of the sliding panel 23'.

Thus from the foregoing it will be observed that I have provided a ventilating window capable of being built into a vehicle body at the time of manufacture of the latter, or capable of being readily applied to vehicle bodies of conventional design after the same have been manufactured. It will also be apparent that I have provided a ventilating system which is relatively simple in construction and may be inexpensively manufactured, assembled and installed.

What I claim as my invention is:

1. A window for a vehicle body having a window opening, a panel slidably supported in the body and adapted to close a portion of said opening, a second ventilating panel in the window opening in the plane of the first panel with one side edge in juxtaposition to the adjacent side edge of the latter panel, and means pivotally supporting the second panel at the aforesaid edge thereof upon the body for outward swinging movement relative to the first panel on an up and down axis parallel to the aforesaid side edge of the sliding panel and spaced from the latter edge toward the opposite edge of the sliding panel at the outer side of the plane of the window opening.

2. A window for a vehicle body having a window opening, a panel slidably supported in the body and adapted to close the rear portion of said opening, a second panel for the forward portion of the window opening adapted to assume a position in the plane of the sliding panel with the rear edge of the former in close proximity and parallel to the front edge of the latter, and means supporting the second panel in the opening for swinging movement about its rear edge on an up and down axis parallel to the front edge of the sliding panel and spaced rearwardly from the latter edge to the outer side of the plane of the window opening.

3. A window for a vehicle having a window opening, a sliding panel having one side edge inclined and adapted to close a portion of the window opening, a second panel in the window opening located in the plane of the first panel with the side edge adjacent the inclined edge of the first panel extending parallel to the latter edge in juxtaposition thereto, and means pivotally supporting the second panel at the inclined edge thereof in the window opening for swinging movement about an up and down axis parallel to the adjacent inclined edges aforesaid of said panels offset from said edges in a lateral direction and also in a direction toward the edge of the sliding panel opposite the inclined edge aforesaid.

4. A window for a vehicle body having a window opening, a panel slidably supported in the body and adapted to close a portion of said opening, a second ventilating panel in the window opening in the plane of the first panel with one side edge in juxtaposition to the adjacent side edge of the latter panel, a frame member having a portion receiving the edge aforesaid of the second panel and having another portion adapted to overlap the outer side of the first panel in the closed position of the latter to support the free edge aforesaid of the first panel, and means pivotally supporting the second panel at the aforesaid edge thereof upon the body on an up and down axis offset laterally outwardly from the plane of the first section and spaced from the edge aforesaid of the latter section in a direction toward the opposite edge thereof.

5. A window for a vehicle body having a window opening, a panel slidably supported in the body and adapted to close the rear portion of said opening, a second panel for the forward portion of the window opening adapted to assume a position in the plane of the sliding panel with the rear edge of the former in close proximity to the front edge of the former, a frame member carried by the rear edge of the second panel having a portion overlapping the outer side of the first panel in the closed position of the latter and forming a support for the free front edge of the first panel, and means pivotally supporting the second panel at the rear edge thereof upon the body on an up and down axis parallel to the front edge of the first panel and predeterminedly located with respect to the latter edge to effect a combined outward and rearward shifting movement of the rear edge of the second panel with respect to the front edge of the first panel upon swinging the second panel outwardly from the plane of the window opening.

6. A window for a vehicle body having a window opening, a panel slidably supported in the body and adapted to close a portion of the window opening, a second ventilating panel in the window opening in the plane of the first panel with one side edge in juxtaposition to the adjacent side edge of the latter panel, a division bar between the juxtapositioned edges fixed to the side edge aforesaid of the second panel and having a flange extending beyond the latter edge and adapted to overlap a portion of the outer side of the first panel, and means pivotally supporting the second panel at the aforesaid edge thereof upon the body for outward swinging movement relative to the first panel on an up and down axis extending parallel to the juxtapositioned edges of the panels and offset laterally outwardly with respect to the plane of the window opening a sufficient distance to avoid interference between the flange and sliding panel upon swinging movement of the pivoted panel about said axis.

7. A window for a vehicle body having a window opening, a panel slidably supported in the body and adapted to close a portion of the window opening, a second ventilating panel in the window opening in the plane of the first panel with one side edge in juxtaposition to the adjacent side edge of the latter panel, a division bar between the juxtapositioned edges and secured to one of said edges, a flange on the division bar extending toward the other of said panels in overlapping relation with a portion of one side of the latter panel, means pivotally supporting the second panel adjacent the aforesaid edge thereof upon the body on an up and down axis predeterminedly located with respect to the juxtapositioned edges to effect a sufficient lateral shifting movement of the pivoted edge of the second panel to avoid interference with the flange on the division bar, and means for holding the pivoted panel in several adjusted positions.

8. In a ventilator for a vehicle of the closed body type having a frame about a side window opening, an independently operable vertically slidable panel supported in the frame and adapted to close the rear of the opening and a second panel in the portion of the opening in advance of and cooperating with the panel aforesaid to close the window opening, means for supporting said second panel for outward swinging movement about an up and down axis located adjacent its rear marginal edge, and a single operating handle for actuating said second panel independently of the movement or position of said first panel, thereby to provide between its forward edge and the frame in front of the opening, a ventilating opening through which air is withdrawn from the inside of the vehicle while in forward motion and also to move said second panel to an angular position relative to the side of the vehicle to scoop air into the vehicle while in forward motion.

HENRY W. MACKEY.